United States Patent [19]

Kresse

[11] Patent Number: 4,907,521
[45] Date of Patent: Mar. 13, 1990

[54] LINE LOCK

[76] Inventor: John A. Kresse, 32 Alma Ave., Lake Grove, N.Y. 11755

[21] Appl. No.: 258,587

[22] Filed: Oct. 17, 1988

[51] Int. Cl.$^4$ ............................................. B63H 25/52
[52] U.S. Cl. .................................... 114/162; 114/218; 24/115 R
[58] Field of Search ............. 114/162, 218; 24/115 R, 24/115 G, 132 R, 132 AA, 133, 134 R

[56] References Cited

U.S. PATENT DOCUMENTS

| 177,590 | 5/1976 | Thomas. | |
|---|---|---|---|
| 536,684 | 4/1895 | Creager | 24/132 AA |
| 2,846,896 | 8/1958 | Allen. | |
| 3,167,299 | 1/1965 | Ling | 24/115 R |
| 3,279,410 | 10/1966 | Young. | |
| 3,677,214 | 7/1972 | Bernstein | 114/218 |
| 3,852,855 | 12/1974 | Bengtsson | 24/115 R |
| 4,178,869 | 12/1979 | Turrentine. | |
| 4,480,572 | 11/1984 | Lauterbach | 114/218 |
| 4,669,582 | 6/1987 | Sawdreid. | |

FOREIGN PATENT DOCUMENTS

| 4281 | of 1914 | United Kingdom | 24/132 AA |
| 2027789 | 2/1980 | United Kingdom | 114/218 |

Primary Examiner—Sherman D. Basinger
Assistant Examiner—Stephen P. Avila
Attorney, Agent, or Firm—Leonard Belkin

[57] ABSTRACT

Locking apparatus for the tiller arm of a small boat having a line in the stern of the boat passing over the tiller arm. A line lock is mounted on the arm through which the line passes. The line lock consists of a base plate mounted on the arm, a pair of side walls and a lock lever through which the line passes, and a lock member to prevent the lever from being lowered from its upper or raised position. When the lever is in its lowered position the holes in the side panels and the lever are aligned thereby permitting the tiller arm to be moved freely. When the arm is raised the line becomes pinched preventing movement of the tiller arm. There is also provided a lock member to prevent the lock lever from dropping from its raised position. All parts are non resilient in construction.

7 Claims, 2 Drawing Sheets

LINE LOCK

BACKGROUND OF THE INVENTION

This invention relates to a line lock and more particularly to a device for locking the tiller of a boat.

In a sail boat where a tiller is employed for steering, the person who is doing the piloting must keep one hand on the tiller as it will not ordinarily, when released, stay in the position it is held. When it becomes necessary for the pilot to leave the position where he can hold on to the tiller, or where some other activity requires both of his hands, some provision must be made to hold the tiller in its position in order to maintain the vessel on its course.

A variety of devices are available to permit the tiller to be locked in place under the circumstances described above. One such device is shown in U.S. Pat. No. 4,080,918 which discloses a two-part hinge device to lock and unlock the tiller line which passes over the tiller. The patented device utilizes a resilient member to release the cover which is employed to crimp the line and lock the tiller in place. It is believed that such a device will not take the wear and tear of everyday use subject to the kind of handling that tillers receive, and, in addition, the assembly lacks a direct or positive means of releasing the tiller line by relying on the resiliency of a member when the release plate is pressed raising a question as to the reliability of the device.

Other devices relating to this subject matter are shown in U.S. Pat. Nos. 177,590, 2,846,896, 3,279,410, 4,178,869, and 4,669,582. None of the foregoing patents teaches or suggests the present invention.

SUMMARY OF THE INVENTION

In the present invention there line lock for fixing the tiller to a tiller line when the tiller is to be left unattended and have its position maintained, and yet be able to readily release the tiller when desired.

A preferred embodiment of the invention includes a base for attachment to the tiller, a pair of side walls or panels having openings to accomodate the tiller line, a pivoted arm for trapping and releasing the tiller line, and a pivoted member for locking the arm when the line is trapped.

All of the parts making up the construction of the preferred embodiment are simple in shape, sufficiently sturdy to successfully resist the wear and tear associated with activities aboard a sailing vessel, inexpensive to make, and easy to install and service.

It is thus a principal object of this invention to provide a device of simple and reliable construction to lock and release a tiller.

Other objects and advantages of this invention will hereinafter become obvious from the following detailed description of a preferred embodiment of this invention.

DETAILED DESCRIPTION OF THE PREFERRED EMBODIMENT

Figure 1:
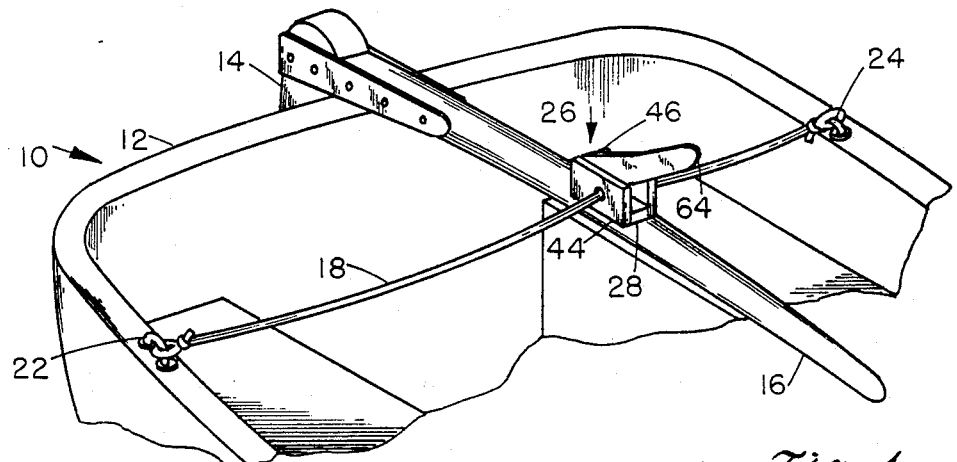
FIG. 1 is a perspective view of the stern of a boat showing the installation of a preferred embodiment of the line lock with the tiller line trapped.
Figure 2:
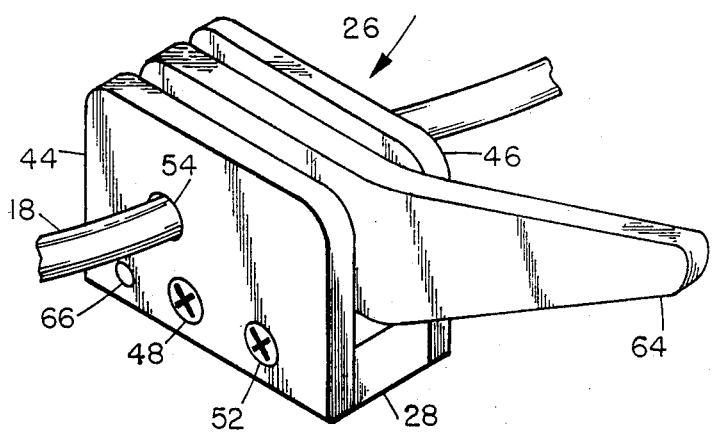
FIG. 2 is a perspective view of the line lock shown in FIG. 1 with the tiller line released.

Referring to FIG. 1, the stern of boat 10 is shown with its transom 12 on which is mounted a tiller 14 having a tiller bar 16 extending into boat 10.

A tiller line 18 is illustrated running across the width of transom 12, passing over tiller bar 16 and attached to the sides of boat 10 by a pair of eyelets 22 and 24. Tiller line 18 passes through line lock 26 embodying the principles of this invention.

Figure 5:
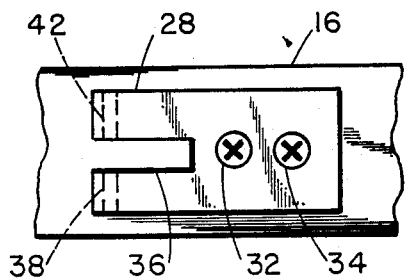
FIG. 5 is a plan view of the base plate of the line lock attached to the tiller bar.

Referring to FIGS. 1–7, line lock 26 consists of a base 28 rectangular in configuration with a pair of holes to accomodate screws 32 and 34 for attaching base 28 to tiller bar 16, as best seen in FIG. 5. Base 28 is provided with a slot 36 and holes 38 and 42 aligned with each other, for a purpose to be described below.

A pair of side walls or panels 44 and 46 rectangular in configuration are mounted on opposite sides of base 28 by screws 48 and 52 for panel 44 and similar screws (not shown) on the opposite side for panel 46. Line lock 26 is mounted on tiller arm 16, in a manner to be described later.

Side panels 44 and 46 are provided with holes 54 and 56, respectively, to accomodate tiller line 18 as shown in the figures.

Figure 7:
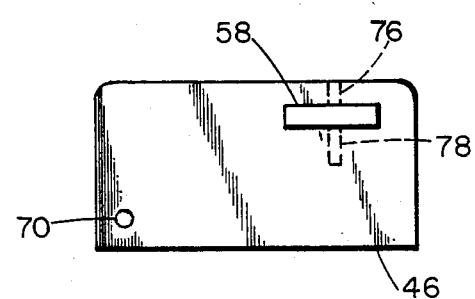
FIG. 7 is a side view of the side panel containing the slotted opening for the lock member.

Side panel 46, as seen in FIG. 7, is provided with a rectangular shaped slot 58 designed to accomodate a lock member 62 which will be described in detail further below.

Figure 6:
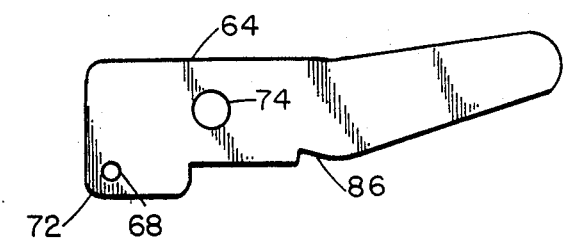
FIG. 6 is a side view of the locking lever in the line lock.

A lock lever 64, whose details are shown in FIG. 6, is pivotally mounted about a pin 66 which passes through holes 38 and 42 in base plate 28, hole 68 in lock lever 64, and holes 69 and 70 in side panels 44 and 46.

Figure 3:
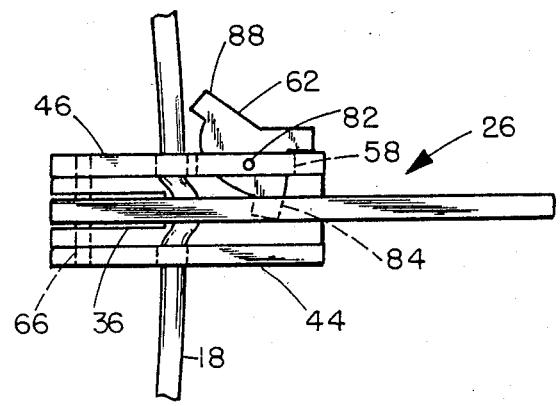
FIG. 3 is a top view of the line lock in its locked position.
Figure 4:
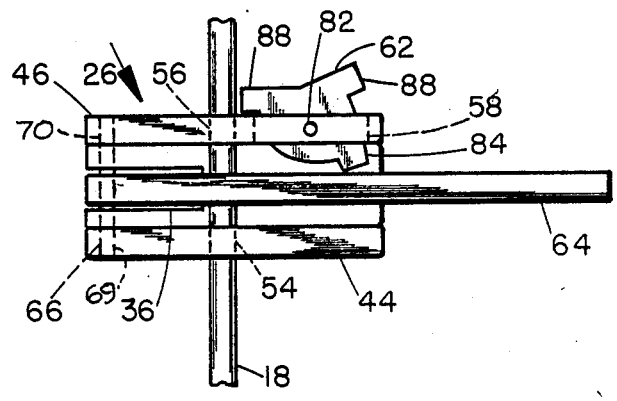
FIG. 4 is a top view of the line lock in its unlocked position.

It will be seen that the heel 72 of lock lever 64 rides in slot 36 of base plate 28 with lock lever 64 being pivoted in the manner described below. Lock lever 64 is also provided with a hole 74 through which tiller line 18 passes. Referring to FIG. 7, it will be seen that side wall or panel 46 containing slotted opening 58 is provided with holes 76 and 78 to accomodate a pin 82 about which lock member 62 pivots. The purpose of member 62 is to block movement of lock lever 64 when in the up position, as seen in FIGS. 1 and 3, crimping line 18 preventing movement of tiller arm 16. In this position it is seen that lock member 62 has been rotated clockwise, passing through slotted opening 58 in side wall or panel 46 with a tooth 84 of member 62 passing into a notch 86 formed in lock lever 64 (see FIG. 6). Lock member 62 is provided with an extension 88 for use by the fingers of the pilot to rotate member between its two positions shown in FIGS. 3 and 4. When member 62 is rotated counter clockwise into its position shown in FIG. 4, lever arm 64 can be lowered, in which case all of the openings for line 18 are lined up and line 18 is freed so that tiller arm 16 can be moved.

All of the parts making up line lock 26 may be constructed of brass to avoid problems associated with corrosion. Since all of the parts have simple shapes, none of the parts rely on resiliency for its operation, and high tolerances are not required, it is readily apparent that the cost of manufacturing the line lock is quite low.

By resiliency herein is meant bending of a part in normal use to function as described. By lack of resiliency is meant that there is no reliance on deformation for the functioning of a member.

In the mounting of the apparatus described, line lock 26 would come fully assembled. Pin 66 would be pushed out to release lock lever 64. Line lock 26 would then be mounted on arm 16 by the use of screws 32 and 34. Line 18 is then threaded through holes 54, 74, and 56 of the side walls 44 and 46, and lock lever 74. Then lever 74 would then be remounted using pin 66; or lever 74 can be replaced after the mounting of plate 28 and then line 18 can be threaded through the holes.

To use line lock 26, lever arm 64 is raised to pinch line 18 as seen in FIG. 3, blocking movement of tiller bar 16, dropping heel 72 into slot 36. Clockwise rotation of lock member 62 prevents the accidental dropping of lever 64 which would release tiller arm 16.

To release tiller line 18 so that tiller arm 16 can be moved freely, lock member 62 is rotated counter clockwise thereby permitting lever arm 64 to be lowered, lining up all the holes through which line 18 passes.

It is thus seen that there has been provided a locking arrangement for a tiller which is simple and economical in construction, easy to install and disassemble if and when necessary to repair, and reliable in being able to withstand the rough usage associated with the operation of small sail boats.

While only a preferred embodiment of this invention has been described it is understood that many variations are possible without departing from the principles of this invention as defined in the claims which follow.

What is claimed is:

1. Apparatus for selectively locking against movement a tiller having an arm extending into the interior of a boat having sidewalls, comprising:
   a. means for supporting the ends of a line on said sidewalls, said line extending across the interior of said boat and over said tiller arm;
   b. line lock means mounted on said tiller arm through which said line passes;
   b. said line lock means comprising base plate means attached to said tiller arm, a pair of side panel means attached to the sides of said base plate means and extending upwardly, lock lever means pivotally mounted about a pin extending through said pair of side panels means and said base plate means, and locking member means mounted in one of said side panel means being pivoted between a first position blocking downward movement of said lock lever means when in a raised position and a second position unblocking the downward movement of said lock lever means;
   c. each of said side panel means and said locking lever means having holes aligned when said locking lever means is in the down position for said line to pass through and permitting said tiller arm to move freely along the length of said line thereby changing the position of said tiller, said line becoming pinched when said lock lever means is raised thereby preventing said tiller arm and said tiller from changing position, all of said side panel means, lock lever means, and said locking lever means lacking resiliency.

2. The apparatus of claim 1 in which said base plate means comprises a plate having two legs forming a slot, said lock lever means having a heel which drops into said slot when said lock lever means is raised.

3. The apparatus of claim 2 in which said pin passes through the two legs of said base plate and said lock lever means is pivoted about said pin.

4. The apparatus of claim 3 in which said lock lever means comprises a flat, elongated plate pivoted at one end and having a handle for raising or lowering said plate.

5. The apparatus of claim 4 in which said elongated plate includes a notch along the underside to receive said locking member means.

6. The apparatus of claim 5 in which said one of said side panel means is provided with a slot, and said locking member means comprises a flat plate pivotally mounted within said slot about a pin passing through said slot, said locking member means plate having a tooth for entering said notch when said locking member means plate is rotated clockwise, and also having an extension to facilitate the movement of said locking member means plate.

7. The apparatus of claim 6 in which said pair of side panel means are supported on the bottom by said base plate and extending upwardly on both sides of said lock lever means plate.

* * * * *